(12) United States Patent
Lutterkort

(10) Patent No.: US 7,502,777 B2
(45) Date of Patent: Mar. 10, 2009

(54) SYSTEM AND METHOD FOR SELF TUNING OBJECT-RELATIONAL MAPPINGS

(75) Inventor: David Lutterkort, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 339 days.

(21) Appl. No.: 11/362,909

(22) Filed: Feb. 28, 2006

(65) Prior Publication Data

US 2007/0203883 A1    Aug. 30, 2007

(51) Int. Cl.
    *G06F 17/30* (2006.01)
(52) U.S. Cl. .............................. 707/2; 707/3
(58) Field of Classification Search ............. 707/2–3, 707/10; 711/2
    See application file for complete search history.

(56) References Cited

U.S. PATENT DOCUMENTS 5,732,240 A * 3/1998 Caccavale ................. 711/118
7,146,352 B2 * 12/2006 Brundage et al. ............. 707/2

* cited by examiner

*Primary Examiner*—Yicun Wu
(74) *Attorney, Agent, or Firm*—MH2 Technology Law Group LLP

(57) ABSTRACT

A system and method for database access by an application program includes a database interface that receives a request to access database data that includes a set of parameters. A mapping module determines the place in the application program code that requested the database data. A retrieval module reads a set of usage statistics and amends the set of parameters based on the usage statistics. A load module fetches the database data and data for related objects that are likely to be accessed from the requested data, based on the amended parameters. Once the database data has been loaded, a tracking module tracks the database data and updates the set of usage statistics accordingly.

33 Claims, 5 Drawing Sheets

US 7,502,777 B2

SYSTEM AND METHOD FOR SELF TUNING OBJECT-RELATIONAL MAPPINGS

FIELD OF THE INVENTION

The present invention relates to database interfaces and, more particularly, to a system and method for efficient access of relational databases by an application program.

BACKGROUND OF THE RELATED ART

Many applications written in object-oriented computer programming languages such as C++ and Java include an object/relational application program interface (O/R API) for accessing relational databases. The O/R API provides an interface for mapping between an application program and the database protocol. A standard protocol for accessing databases is structured query language (SQL). SQL includes features that allow users to query, update, insert data into, and delete data from a database. For example, when a program written in the Java programming language requires access to a database, the program can employ the JDBC Application Program Interface (JDBC API) and its associated drivers. Through JDBC, programs written in the Java programming language may access a database using standard SQL queries. More specifically, a Java-program can use JDBC to establish a connection with a database, send SQL statements to the database, process a result from the database and return a result to the program.

Relational databases typically represent data in tabular format whereas object-oriented languages represent data as graphs of interconnected objects. When reading data, the O/R API must decide which parts of an object graph to query from the database without knowing exactly how that data will be used. This usually leads to the O/R API reading more data than is needed by the program using the data and causes performance problems. To address these performance problems, developers can manually program the O/R API to read specific parts of the object graph. This manual annotation of the O/R API is very labor-intensive, error prone, and usually is only done to address the most serious performance problems.

SUMMARY

In accordance with the invention, there is provided a system and method for database access by an application program. An application program's database interface accesses a database by receiving a request to access database data that includes a set of parameters. A mapping module determines the place in the application program code that requested the database data. A retrieval module reads a set of usage statistics. The usage statistics include statistics showing how the database data is used by the application program. The retrieval module also amends the set of parameters if the usage statistics indicate that the application program will not use the database data requested according to the set of parameters. A load module fetches a subset of the requested database data from the database based on the parameters amended by the retrieval module.

The usage statistics can be pre-generated, for example, by running the application program and recording statistics for use by later runs of the application, or updated during operation of the application program. Once the database data has been loaded, a tracking module tracks the database data to determine how it is used by the application program. The tracking module updates the set of usage statistics based on the tracking of how the database data is used by the application program.

Additional embodiments of the invention will be set forth in part in the description which follows, and in part will be obvious from the description, or may be learned by practice of the invention. The features of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the exemplary embodiments of the invention, examples of which are illustrated in the accompanying drawings. Wherever possible, the same reference numbers will be used throughout the drawings to refer to the same or like parts.

Figure 1:
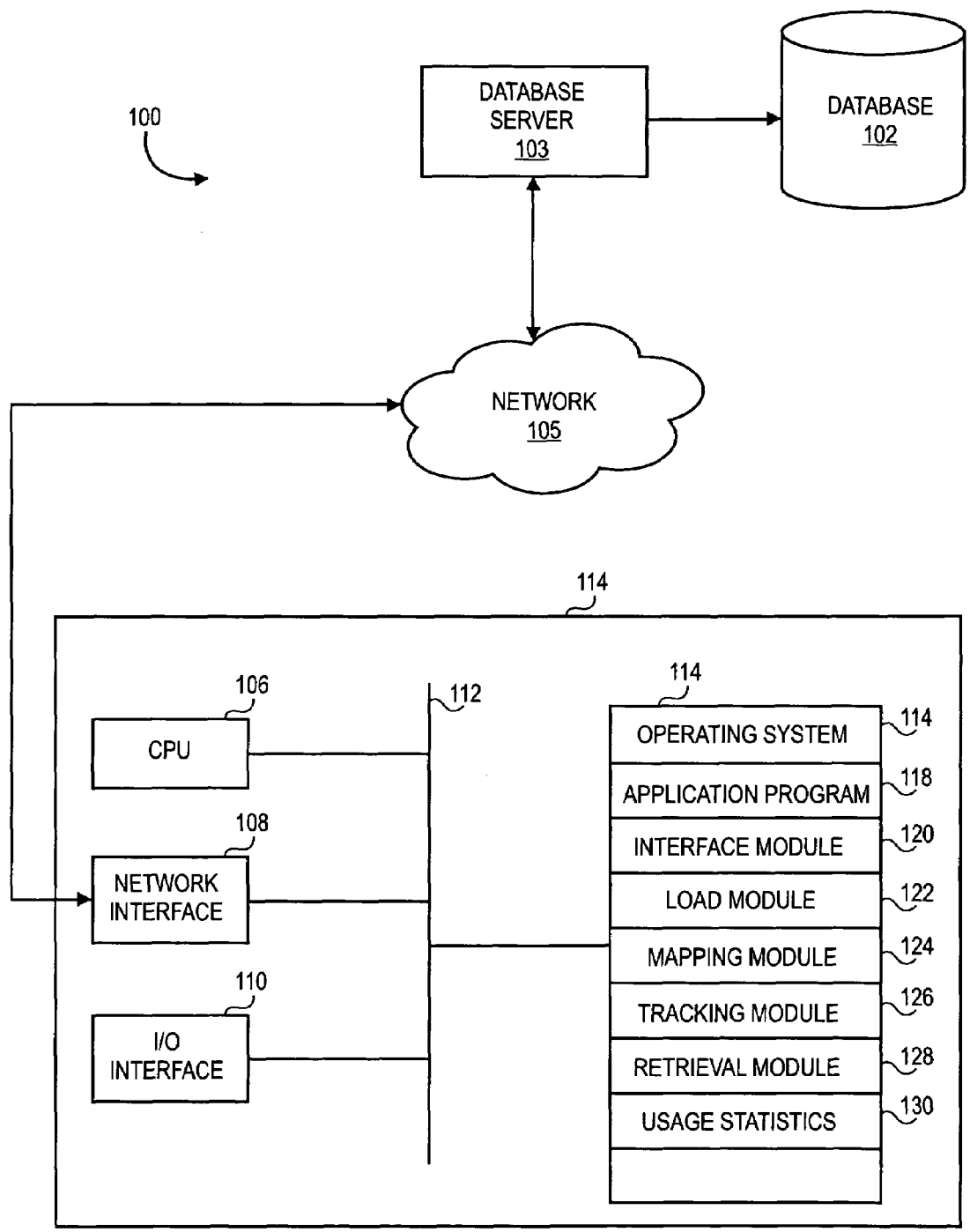
FIG. 1 depicts a block diagram of a database interface system 100, consistent with systems and methods consistent with the present invention.

FIG. 1 depicts a block diagram of a database interface system 100, consistent with systems and methods consistent with the present invention. System 100 includes a database 102 and a network 105 connecting a database server 103 and a database interface computer 104. Network 105 can be a combination of networks including the Internet, corporate intranets, and other networks compatible with a networking protocol such as TCP/IP. Database 102 includes database tables containing database data. In one embodiment, database data includes objects associated with database applications written in object-oriented computer languages.

Database interface computer 104 includes a central processing unit (CPU) 106, a network interface 108, I/O interface 110, and a memory 114. CPU 106 executes instructions associated with applications contained in memory 114 and transmits results to other subsystems in database interface computer 104 over a high speed interconnect or bus 112. I/O interface 110 is an interface used to couple database interface computer 104 with devices such as a keyboard, a mouse, a display device, and any other I/O device useful in operating and managing database interface computer 104 as is understood by one of skill in the art. Network interface 108 is used to communicate with network 105.

Memory 114, in one embodiment, includes: an operating system 116 for managing operations of computer 104; an application program 118 having program instructions that when executed communicate with database 102; an interface module 120 having program instructions that when executed receive queries from application program 118 and return database data to application program 118; a load module 122 having program instructions that when executed load database data according to a set of parameters requested in a query; a mapping module 124 having program instructions that when executed maps code in application program 118 to a set of usage statistics 130; a tracking module 126 having program instructions that when executed tracks how database data is used by application program 118 and updates usage statistics 130 accordingly; and a retrieval module 128 having program instructions that when executed amends the set of parameters requested in a query based on usage statistics 130.

In one embodiment, application program 118 may send a request to interface module 120 to load database data for a requested object and for related objects that are likely to be accessed from the requested object. Application program 118 is typically written in an object-oriented programming language such as C++ or Java. In one embodiment, application program 118 can be a server application that communicates with a client computer (not shown) over network 105 through network interface 108. In another embodiment, application program 118 may include a graphical user interface that receives information directly from a user through I/O interface 110 from a user input device (not shown) such as a keyboard.

Figure 2:
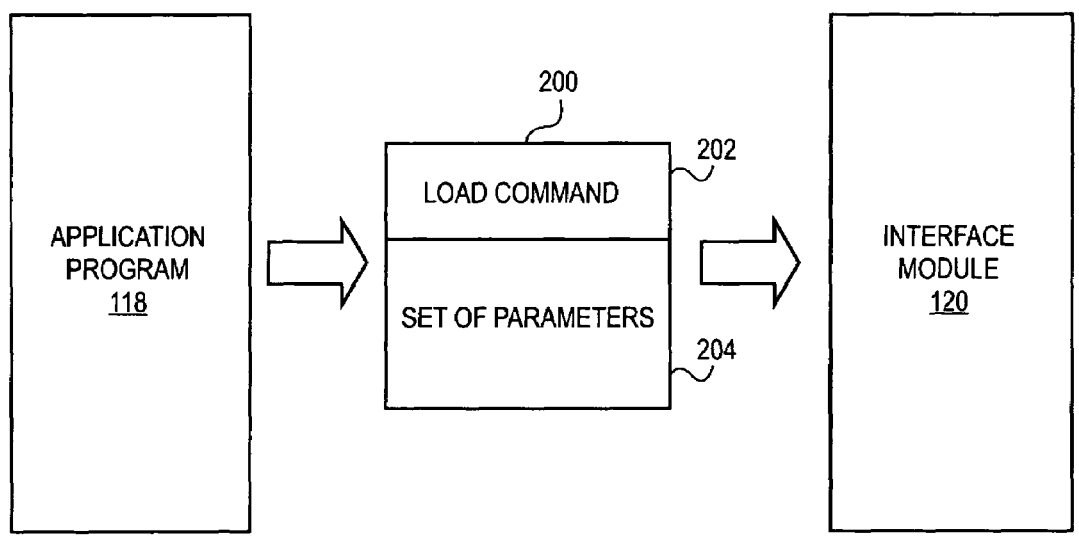
FIG. 2 depicts a block diagram of a request to load database data, in accordance with systems and methods consistent with the present invention.
Figure 3:
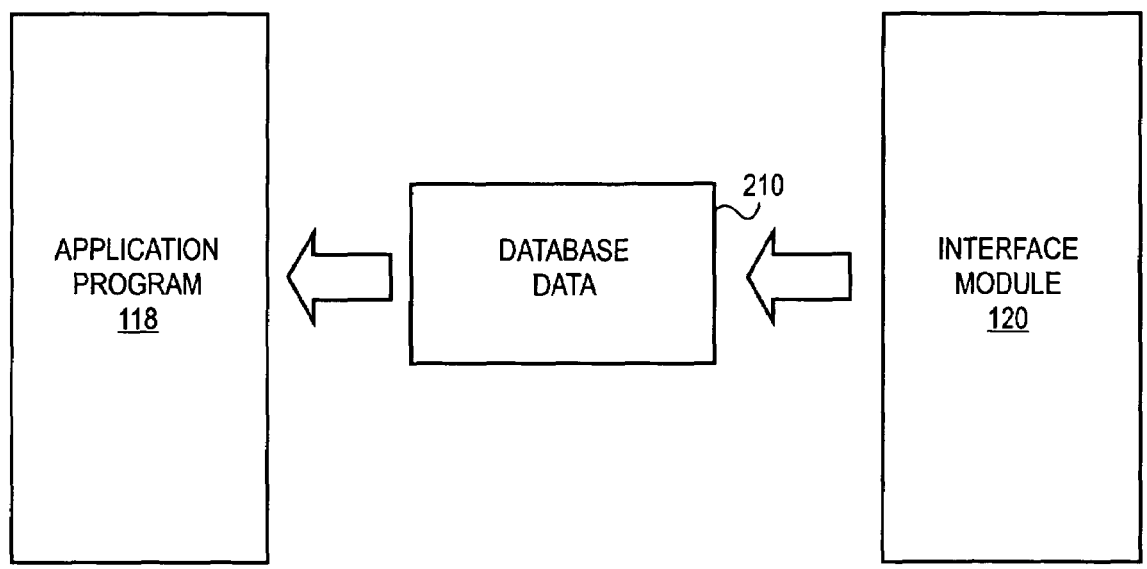
FIG. 3 depicts a block diagram of a response to a request to load database data, in accordance with systems and methods consistent with the present invention.

FIG. 2 depicts a block diagram of a request to load database data and FIG. 3 depicts a block diagram of a response to a request to load database data, in accordance with systems and methods consistent with the present invention. Referring to FIG. 2, request 200 is sent from application program 118 to interface module 120. Request 200 consists of a load command 202 and a set of parameters 204. Load command 202 instructs interface module 120 to load the requested database data and parameters 204 identifies the database data to be loaded. Referring to FIG. 3, interface module 120 returns database data 210 in response to request 200. In one embodiment, parameters 204 can include metadata describing an object to be loaded and database data 210 consists of a set of objects. For example, an address book application program may model people in such a way that each person can have a number of associated addresses (home, work, etc.) and an associated employer, which are objects in their own right. The address book application can send a request to load a person including the set of metadata relating to each associated address and employer.

Figure 4:
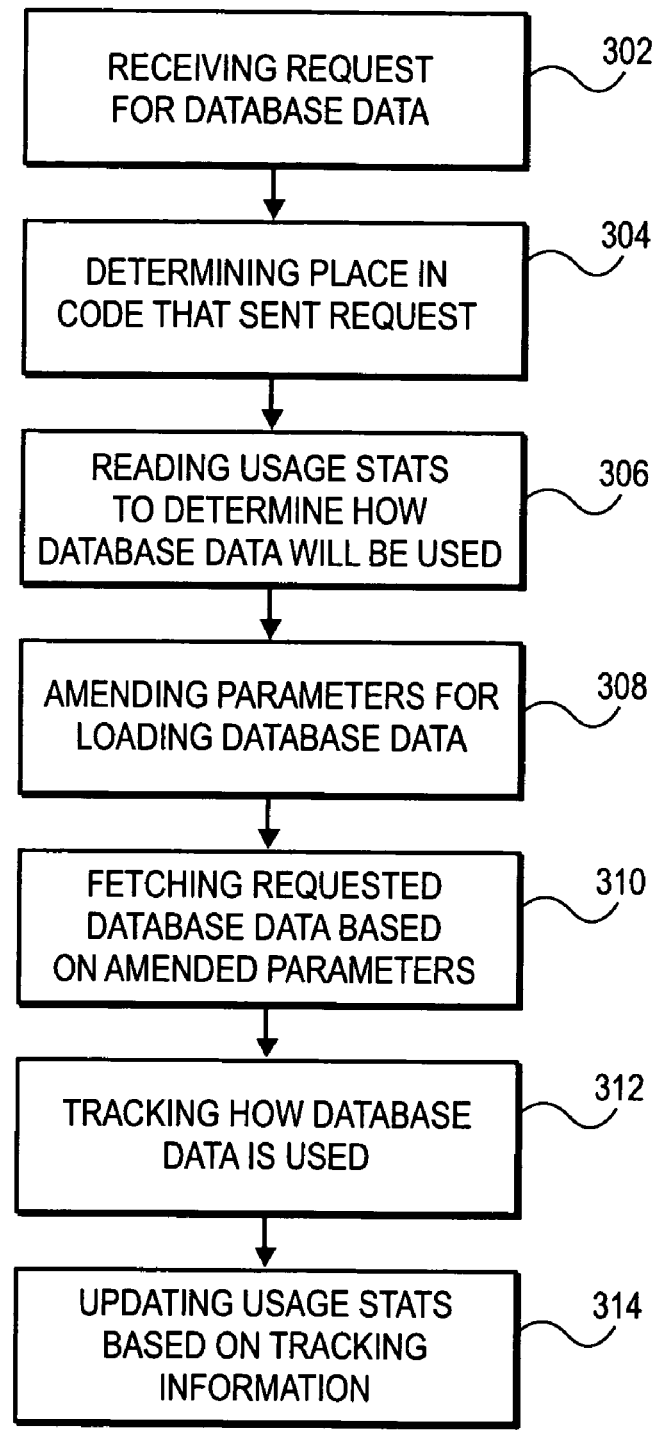
FIG. 4 depicts a flow diagram of an exemplary database access process, in accordance with systems and methods consistent with the present invention.

In general, embodiments of the present invention may provide an O/R API, which is capable of tuning which data to load. In particular, exemplary embodiments may provide an O/R API in which not only is data for a requested object loaded, but also data for related objects that are likely to be accessed from the requested object are loaded as well. The data that is loaded for a requested object and its related objects can be tuned based on pre-generated usage statistics or actual usage statistics measured from operations of the application program. Accordingly, embodiments of the present invention can provide an O/R API that makes efficient decisions and can optimize the operations of the application. Some examples of such tuning as can be accomplished are illustrated in the following figures. Referring now to FIG. 4, it depicts a flow diagram of an exemplary database access process, in accordance with systems and methods consistent with the present invention. The flow diagram will be described with reference to the embodiment of the system depicted in FIG. 1 and the block diagrams of FIGS. 2 and 3. Upon receiving (step 302) request 200 from application program 118, interface module 120 initiates mapping module 124. Mapping module 124 determines (step 304) the place in the code, such as the line number or using a stack trace, of application program 118 that sent request 200. In the address book example, persons can be loaded in two distinct places in the code: P1 and P2, each represented by the stack trace that causes the execution of P1 and P2. At P1 in the code, the address book application displays the person in a list. At P2 in the code, the address book application displays the person for editing. Accordingly, when a person is loaded at P1, the address book application will never access the address objects, whereas when a person is loaded at P2, the address book application will access the address objects. Thus, mapping module 124 determines the place in the code (i.e. P1 or P2) that requested to load the person.

Figure 5:
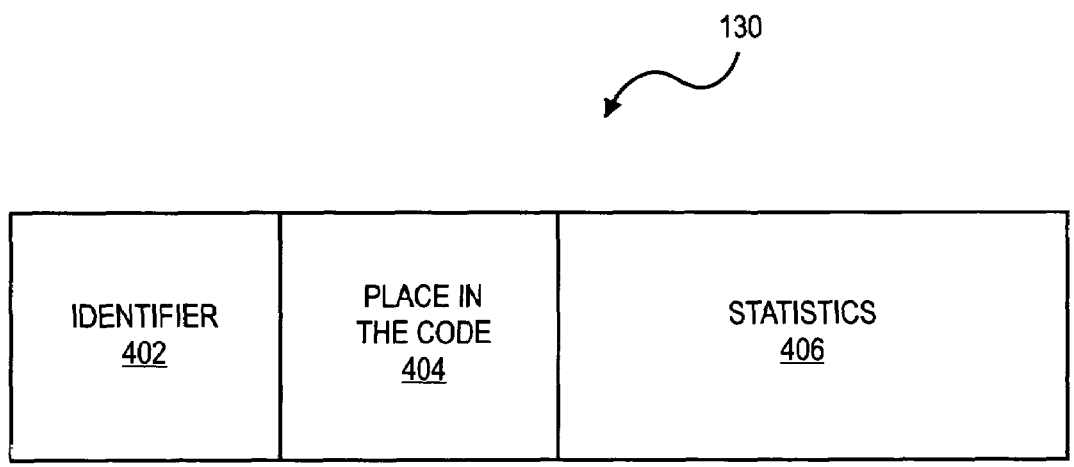
FIG. 5 depicts a block diagram of exemplary usage statistics 130, consistent with systems and methods consistent with the present invention.

After mapping module 124 has determined the place in the code of application program 118 that sent request 200, retrieval module 128 reads (step 306) usage statistics 130 to determine how database data 210 will be used by application program 118. FIG. 5 depicts a block diagram of exemplary usage statistics 130, consistent with systems and methods consistent with the present invention. The block diagram will be described with reference to FIGS. 2 and 3. Usage statistics 130 include an identifier 402, which is an identification of database data 210 that will be-used by application program 118. For example, identifier 402 can include metadata identifying a requested object. Usage statistics 130 also include the place in the code 404 that sent request 200 for database data 210. As set forth above, the place in the code 404 can be represented as a stack trace in one embodiment.

Usage statistics 130 also include statistics 406 indicating how database data 210 will be used by application program 118. For example, statistics 406 can include an indicator showing which parts of the object graph constructed from database data 210 will or will not be accessed by application program 118. In one embodiment, statistics 406 can also include timing information regarding the use of database data 210 to indicate, for example, when database data 210 was used, times to load and/or retrieve database data 210, and the likelihood that an object will be accessed. Timing information refers to how long it takes to retrieve database data 210, or part of database data 210 using different queries to retrieve the requested object and related objects. In addition, statistics 406 can include an access ratio of the number of times database data 210 is accessed by application program 118 versus the number of times database data 210 is requested by application program 118. For example, a requested object may only be accessed by application program 118 under certain conditions and, therefore, the requested object may only be accessed by application program 118 only a few times versus the number of times the object is requested. Additional statistics can be implemented as is understood by one of skill in the art. Usage statistics 130 can be pre-generated during the development phase of application program 118 by running application program 118 and measuring various aspects of its operations, or they can be tracked during execution of application program 118 as described below.

Returning to FIGS. 1, 2, 3, and 4, based on usage statistics 130, retrieval module 128 amends (step 308) parameters 204 used by load module 122 to retrieve database data 210 from database 102. For example, retrieval module 128 may determine usage statistics 130 indicate that a requested object will not be accessed by application program 118; retrieval module 128 will therefore amend parameters 204 so that the requested object will not be loaded. Retrieval module 128 may determine that usage statistics 130 indicate that given the time it needs to load objects related to the requested object and the ratio with which related object is used by the application, it is more efficient to load related objects together with or separately from the requested object. Retrieval module 128 can amend parameters 204 so that related objects will be loaded at that time, or so that load module 122 will query database 102 at a later time. In this way, load module 122 will query database 102 for database data necessary for the efficient operation of application program 118.

After retrieval module 128 has been initiated, interface module 120 initiates load module 122. Load module 122 fetches (step 310) database data 210 from database 102 based on amended parameters 204. To access database 102, load module 122 employs a database language such as, in one embodiment, SQL. In one embodiment, load module 122 sends SQL statements to database server 103 requesting the requested database data 210.

Returning to the address book example, upon a request to load a person from P1, retrieval module 128 reads usage statistics 130 and determines that address book application will not use the address objects. Retrieval module 128 amends parameters 204 used by load module 122 so that load module 122 will not fetch the address objects. Similarly, upon a request to load another person from P2, retrieval module 128 reads usage statistics 130 and determines that address book application will use the address objects. Retrieval module 128 will amend parameters 204 used by load module 122 so that load module 122 will fetch the address objects. Retrieval module 128 may read timing information from usage statistics 130 to determine that the associated employer objects are accessed infrequently and only after the address book application has accessed the associated address objects. Retrieval module 128 can wait until the employer object is actually accessed, then initiate load module 122 to fetch the associated employer object.

In one embodiment, interface module 120 can initiate tracking module 126 to track (step 312) how database data 210 is used by application program 118 and to update (314) usage statistics 130 accordingly. In one embodiment, tracking module 126 annotates the returned database data with the place in the code determined by mapping module 124. In Java, this could be done through bytecode annotation. Tracking module 126 can then track how database data 210 has been used by application program 118 and update usage statistics 130 accordingly.

Returning to the address book example, if a person is loaded at P1, tracking module 126 annotates the person object and its associated address objects with an identifier such as P1. When the address book application fails to use the associated address objects, tracking module 126 records in usage statistics 130 that address book application failed to access the address objects. Similarly, if a person is loaded at P2, tracking module 126 annotates the person object and its associated address objects with P2. When the address book application uses the associated address objects for editing, tracking module 126 records in usage statistics 130 that address book application accessed the address objects.

The present invention can be implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of accessing a database by a database interface of an application program comprising:

receiving a request from the application program executing on an interface computer to access database data comprising a set of parameters;

determining a place in application program code of the application program that requested the database data;

reading a set of usage statistics, the usage statistics comprising statistics showing how the database data is used by the application program;

amending the set of parameters if the usage statistics indicate that the application program will not use the database data requested according to the set of parameters; and fetching a subset of the database data from the database based on the amended set of parameters, the subset of the database data to be used by the application program.

2. The method of claim 1 further comprising tracking the database data to determine how it is used by the application program.

3. The method of claim 2 further comprising updating the set of usage statistics based on the tracking of how the database data is used by the application program.

4. The method of claim 1 further comprising fetching a second subset of the database data based on the amended set of parameters.

5. The method of claim 1 wherein the database data is a set of objects.

6. The method of claim 5 wherein the subset of the database data is a subset of the set of objects.

7. The method of claim 5 wherein the set of parameters comprises metadata associated with the set of objects.

8. The method of claim 1 wherein the statistics comprise timing information.

9. The method of claim 1 wherein the statistics comprise an indicator showing the database data will or will not be accessed by the application program.

10. The method of claim 1 wherein the statistics comprise an access ratio of a number of times the database data is accessed by the application program versus a number of times the database data is requested by the application program.

11. The method of claim 1 wherein the usage statistics are pre-generated during development of the application program.

12. A system of database access comprising:

a central processing unit;

a memory comprising a set of usage statistics comprising statistics showing how database data is used by an application program within an interface computer;

an interface module configured for execution by the central processing unit comprising instructions for receiving a request from the interface computer to access database data comprising a set of parameters;

a mapping module configured for execution by the central processing unit comprising instructions for determining a place in application program code that requested the database data;

a retrieval module configured for execution by the central processing unit comprising instructions for reading the set of usage statistics and for amending the set of parameters if the usage statistics indicate that the application program will not use the database data requested according to the set of parameters; and a load module configured for execution by the central processing unit comprising instructions for fetching a subset of the database data from the database based on the amended set of parameters, the subset of the database data to be used by the application program.

13. The system of claim 12 further comprising a tracking module configured for execution by the central processing unit comprising instructions for tracking the database data to determine how it is used by the application program.

14. The system of claim 13 wherein the tracking module further comprises instructions for updating the set of usage statistics based on the tracking of how the database data is used by the application program.

15. The method of claim 12 wherein the load module further comprises instructions for fetching a second subset of the database data based on the amended set of parameters.

16. The system of claim 12 wherein the database data is a set of objects.

17. The system of claim 16 wherein the subset of the database data is a subset of the set of objects.

18. The system of claim 16 wherein the set of parameters comprises metadata associated with the set of objects.

19. The system of claim 12 wherein the statistics comprise timing information.

20. The system of claim 12 wherein the statistics comprise an indicator showing the database data will or will not be accessed by the application program.

21. The system of claim 12 wherein the statistics comprise an access ratio of a number of times the database data is accessed by the application program versus a number of times the database data is requested by the application program.

22. The system of claim 12 wherein the usage statistics are pre-generated during development of the application program.

23. A computer program product for use in conjunction with a computer system, the computer program product comprising a computer readable storage medium and a computer program mechanism embedded therein, the computer program mechanism comprising:

a set of usage statistics comprising statistics showing how database data is used by an application program within an interface computer;

an interface module for receiving a request from the interface computer to access the database data comprising a set of parameters;

a mapping module for determining a place in application program code that requested the database data;

a retrieval module for reading the set of usage statistics and for amending the set of parameters if the usage statistics indicate that the application program will not use the database data requested according to the set of parameters; and a load module for fetching a subset of the database data from the database based on the amended set of parameters, the subset of database data to be used by the application program.

24. The computer program mechanism of claim 23 further comprising a tracking module configured for execution by the central processing unit comprising instructions for tracking the database data to determine how it is used by the application program.

25. The computer program mechanism of claim 24 wherein the tracking module further comprises instructions for updating the set of usage statistics based on the tracking of how the database data is used by the application program.

26. The computer program mechanism of claim 23 wherein the load module further comprises instructions for fetching a second subset of the database data based on the amended set of parameters.

27. The computer program mechanism of claim 23 wherein the database data is a set of objects.

28. The computer program mechanism of claim 27 wherein the subset of the database data is a subset of the set of objects.

29. The computer program mechanism of claim 27 wherein the set of parameters comprises metadata associated with the set of objects.

30. The computer program mechanism of claim 23 wherein the statistics comprise timing information.

31. The computer program mechanism of claim 23 wherein the statistics comprise an indicator showing the database data will or will not be accessed by the application program.

32. The computer program mechanism of claim 23 wherein the statistics comprise an access ratio of a number of times the database data is accessed by the application program versus a number of times the database data is requested by the application program.

33. The computer program mechanism of claim 23 wherein the usage statistics are pre-generated during development of the application program.

* * * * *